United States Patent Office 2,980,728
Patented Apr. 18, 1961

2,980,728

N-(ALKYL, ARYL AND HETEROCYCLIC)β-(CARBOALKOXY AND CARBOARYLOXY) ALKANOYL AMIDES

Carl J. Buck, Fresh Meadows, and Barry M. Bloom, Kew Gardens, N.Y., assignors to Chas. Pfizer & Co., Inc., Brooklyn, N.Y., a corporation of Delaware No Drawing. Filed Aug. 4, 1959, Ser. No. 831,467

7 Claims. (Cl. 260—471)

This invention relates to new and useful compounds which are valuable therapeutic agents. More particularly, it is an object of this invention to provide new and useful compounds which are chemotherapeutic agents valuable in the treatment of mental disease, commonly referred to as psychic energizers. Other objects of the present invention will become obvious from the following disclosure.

The new compounds of the present invention may be represented by the following formula:

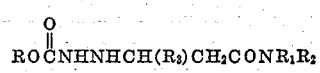

wherein:

$R_1$ is hydrogen or lower alkyl;

$R_2$ is selected from the group consisting of alkyl and alkenyl preferably containing up to 5 carbon atoms; cycloalkyl containing 3 to 6 carbon atoms, pyridyl, pyridylalkyl, furylalkyl and thienylalkyl in which the alkyl group is lower alkyl, and ring-substituted derivatives thereof in which said ring-substituent is a lower alkyl group; aryl and aralkyl represented by the formula:

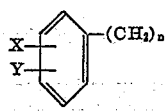

wherein X is hydrogen, lower alkyl or halogen; Y is hydrogen, lower alkyl, lower alkoxy, halogen, trifluoromethyl, cyano or alkanoyl containing 2 to 4 carbon atoms; and $n$ is an integer from 0 to 4;

$R_3$ is hydrogen or alkyl containing 1 to 3 carbon atoms; and

R is selected from the group consisting of lower alkyl, phenyl, and phenylalkyl in which the alkyl group contains from 1 to 4 carbon atoms.

Also included within the scope of this invention are the acid addition salts of the basic nitrogen compounds described.

The carbon content of the various hydrocarbon substituents described above represents preferred substituents. These are preferred since compounds containing them are readily preparable and economical. Of course, substituents of higher carbon content may be employed. Further, the phenyl group may be substituted by a variety of substituents such as fluoro, chloro, bromo, alkyl, alkoxy, and the like, but since such compounds provide no appreciable advantage, they are not preferred. Further, the aryl and heterocyclic radicals may be replaced by the corresponding benz-type compounds, that is, those containing a fused benzene ring, such as naphthalene, benzofuran, benzothiophene and the like, with no appreciable advantage being realized.

The present new compounds are prepared by the condensation of a hydrazine, $ROCONHNH_2$ with α,β-unsaturated amides of the formula: $R_3$—CH=CHCONR$_1$R$_2$ in which $R_1$, $R_2$ and $R_3$ are as described above. For example, an amide of acrylic acid is condensed with $ROCONHNH_2$ in which R is as above described to produce

The reaction is carried out by heating a mixture of the two reactants in at least an equimolar ratio in an inert organic solvent and in the presence of a lower alkanoic acid which is generally employed in catalytic amounts. At least 1% of alkanoic acid by volume of the total reaction mixture should be employed. Generally, it is found that the optimum level of alkanoic acid is from 1% to 5% by volume of the total reaction mixture. Larger amounts of catalyst may be used but reduced yield of product may be realized in so doing. Although it is preferred to employ acetic acid as catalyst, other lower alkanoic acids may be used, viz. formic, propionic, butyric and the like. By inert organic solvents as employed herein is meant an organic solvent which dissolves the reactants but does not react with same under the reaction conditions described. Such solvents may be readily determined by routine experimentation in the laboratory. Although a number of other solvents may be employed, excellent results are obtained when using tertiary alcohols. Tertiary alcohols, as is well known, are alcohols in which there is no hydrogen on the carbon atoms to which the hydroxy group is attached, each of the valences of this carbon atom being involved in carbon to carbon linkage. Exemplary of these alcohols are tertiary butyl alcohol, 1,1 - dimethylpropanol, 1,1 - dimethylbutanol, 1-methyl-1 ethylbutanol, 1,1-dimethylpentanol and the like. The mixture is conveniently heated at the reflux temperature of the solvent, although lower temperatures may also be employed, for example, a temperature of 50° C. The reaction is completed in as little as 6 hours although generally, time periods of from 6 to 24 hours at the above specified temperatures are employed. In many cases, the use of excess α,β-unsaturated acid amide is found to appreciably improve the yield of the product. Up to 40% molar excess of unsaturated amide is found to enhance the yield of product. After the reaction is complete, the product is obtained by standard procedures, such as concentration, crystallization and filtration procedures. The product may be purified by standard procedures of recrystallization from solvents such as lower alkanols for example, methanol, ethanol, propanol, etc., ethyl acetate, acetone and the like.

The starting hydrazine compound, $ROCONHNH_2$, may be prepared by standard procedures known in the art. For example, they may be prepared by reacting a suitable carbonate, ROCOOR, with hydrazine as described in J. Amer. Chem. Soc. 80, 3762–3764 (1958).

The new therapeutic agents of the present invention possess considerable activity in the treatment of mental depression. Further, the instant agents possess a higher therapeutic index than many prior art agents. Therapeutic index as employed herein refers to the ratio of therapeutic activity to toxicity. The use of many prior art agents in the treatment of mental depression is attended by considerable toxic reactions in the patient. The ratio of activity to toxicity of a therapeutic agent is obviously most important in selecting such an agent. Although many agents are quite active therapeutically, their use is seriously curtailed by excessive toxicity. The present therapeutic agents, due to their high therapeutic index, are most desirable for treating of mental depression.

The physician will indicate daily dosage of the therapeutic agents of this invention. The dosage will be dependent upon the extent of mental depression, whether mild or severe. In cases of mild depression, dosage of from 10 to 50 milligrams per day may be indicated. In severe depression, considerably higher daily dosage may be required, for example, up to 150 milligrams and higher. Tablets or capsules containing 10, 25, 50 and 150 milligrams of the instant therapeutic agents are convenient unit dosage forms for daily administration. Such tablets or capsules may be prepared from mixtures of the present compounds with well known pharmaceutical excipients, such as starch, sugar, tapioca, certain forms of clay and the like. Alternatively, liquid preparations may be prepared from mixtures of the present therapeutic agents and pharmaceutically acceptable liquid media, such as water, aqueous glycols, sugar solutions and the like which may contain conventional flavoring and coloring agents.

Since a number of the compounds of the present invention are basic, advantage may be taken of the water solubility of salts of these compounds formed with acids in the isolation and/or purification of the above compounds and in the preparation of aqueous solutions of these new compounds for oral or parenteral administration. Of course, only salts formed with pharmaceutically-acceptable acids should be employed in therapeutic applications. Particularly effective salts are those formed with pharmaceutically-acceptable acids having a pK value of 3 or lower. Such acids are well-known in the art, for example, hydrochloric, hydrobromic, sulfuric, nitric, phosphoric, benzenesulfonic, toluenesulfonic, methylsulfonic, ethylsulfonic acids and the like. These salts may be prepared by procedures commonly employed in the art, for example, reacting the compound with an equivalent of the selected acid in aqueous solution and concentration of the solution. Other known procedures may also be employed.

The following examples are given by way of illustration and are not to be construed as limitations of this invention many variations of which are possible within the scope and spirit thereof.

EXAMPLE I

*N-benzyl-β-(carbobenzoxyhydrazino)propionamide*

A mixture of 8.3 g. of carbobenzoxyhydrazine and 8.1 g. of N-benzylacrylamide is refluxed in 50 ml. of t.-butanol to which is added 2 ml. of glacial acetic acid. Refluxing is continued for 24 hours after which the mixture is concentrated to a pale yellow solid. Trituration of this solid with ether followed by filtration gives 8.6 g. of white solid.

The white solid is recrystallized from methanol to yield 1.5 g. of N-carbobenzoxy-N'-bis[β-(benzylcarboxamido)ethyl]hydrazine, M. 184–189° C.

Elemental analysis gives the following results: Calculated for $C_{28}H_{32}N_4O_4$: C, 68.8; H, 6.6; N, 11.5. Found: C, 69.1; H, 6.5; N, 11.5.

Concentration of the methanol filtrate followed by recrystallization of the residue from ethyl acetate afforded N-benzyl-β-(carbobenzoxyhydrazino)propionamide; M. 121–122° C.

Elemental analysis gives the following results: Calculated for $C_{18}H_{21}N_3O_3$: C, 66.0; H, 6.5; N, 12.8. Found: C, 65.8; H, 6.1; N, 13.0.

EXAMPLE II

*Carbobenzoxyhydrazine*

A solution of 9.0 g. of hydrazine hydrate and 40 g. of dibenzylcarbonate is stirred and heated at 100° C. for 4 hours. After removing the excess hydrazine by heating at 100° C. and 0.1 to 0.2 mm. pressure, the residue is recrystallized from 450 ml. of ether to obtain 18 g. of product.

EXAMPLE III

*N-benzyl-β-(carboethoxyhydrazino)propionamide*

The procedure of Example I is repeated with carboethoxyhydrazine in place of carbobenzoxyhydrazine to obtain this product.

EXAMPLE IV

*N-benzyl-β-(carbophenoxyhydrazino)propionamide*

The procedure of Example I is repeated with carbophenoxyhydrazine in place of carbobenzoxyhydrazine to obtain this product.

EXAMPLE V

Additional compounds are prepared by the method of Example I employing suitable hydrazines and appropriate α,β-unsaturated amides:

N-benzyl-β-(carbopropoxyhydrazino)propionamide
N-furfuryl-β-(carbophenylbutoxyhydrazino)propionamide
N-phenylethyl-β-(carbobenzoxyhydrazino)propionamide
N-(3,4-dimethoxyphenylethyl)-β-(carbobutoxyhydrazino)propionamide
N-(3-methylbenzyl)-β-(carbophenylethoxyhydrazino)propionamide
N-(4-methylbenzyl)-β-(carbobenzoxyhydrazino)propionamide
N-(2-chlorobenzyl)-β-(carbomethoxyhydrazino)propionamide
N-(2-methylbenzyl)-β-(carbobutoxyhydrazino)propionamide
N-(3,4-dichlorobenzyl)-β-(carbophenoxyhydrazino)propionamide
N-(2,4-dichlorobenzyl)-β-(carbobenzoxyhydrazino)propionamide
N-benzyl-β-(carbomethoxyhydrazino)propionamide
N-benzyl-β-(carbotoloxyhydrazino)propionamide
N-methyl-β-(carbobenzoxyhydrazino)propionamide
N-ethyl-β-(carbobenzoxyhydrazino)butyramide
N-n-propyl-β-(carboethoxyhydrazino)propionamide
N-i-propyl-β-(carbophenoxyhydrazino)propionamide
N-n-butyl-β-(carbophenethoxyhydrazino)hexanoamide
N-i-butyl-β-(carbobenzoxyhydrazino)butyramide
N-cyclohexyl-β-(carbomethoxyhydrazino)hexanoamide
N-picolyl-β-(carbobenzoxyhydrazino)propionamide
N-propyl-N-p-methoxybenzyl-β-(carbobenzoxyhydrazino)propionamide
N-ethyl-N-benzyl-β-(carbobenzoxyhydrazino)propionamide
N-allyl-β-(carbobenzoxyhydrazino)propionamide
N-phenethyl-β-(carbobenzoxyhydrazino)hexanoamide
N-benzyl-β-(carbobenzoxyhydrazino)hexanoamide
N-benzyl-β-(carbobenzoxyhydrazino)butyramide
N-methyl-N-benzyl-β-(carbobenzoxyhydrazino)butyramide

EXAMPLE VI

Further compounds are prepared according to the above procedures and are found in Table I.

TABLE I.—ROCONHNHCH(R₃)CH₂CONR₁R₂

| R | R₁ | R₂ | R₃ |
|---|---|---|---|
| benzyl | H | p-BrC₆H₄CH₂ | H |
| Do | H | p-IC₆H₄CH₂ | H |
| methyl | CH₃ | p-FC₆H₄CH₂ | H |
| ethyl | C₂H₅ | 6-CH₃(C₅H₃N)CH₂ | H |
| butyl | H | p-C₂H₅OC₆H₄ | CH₃ |
| phenylethyl | H | p-CH₃OC₆H₄ | C₂H₅ |
| phenylbutyl | H | p-C₃H₇OC₆H₄CH₂ | H |
| pentyl | C₃H₇ | C₆H₅ | H |
| methyl | H | C₆H₄C₂H₄ | CH₃ |
| benzyl | H | 2-(C₅H₄N)CH₂ | H |
| tolyl | H | 2-(C₅H₄N)C₂H₄ | H |
| benzyl | H | 2-(C₄H₃O)CH₂ | H |
| ethyl | H | 2-(C₄H₃O)CH₂ | H |
| benzyl | H | 3,4-Cl₂C₆H₃CH₂ | H |
| methyl | H | p-C₃H₇C₆H₄CH₂ | H |
| butyl | H | n-C₄H₉ | H |
| phenyl | H | allyl | H |
| methyl | H | pentenyl | H |
| ethyl | H | cyclobutyl | H |
| pentyl | H | cyclopropyl | H |
| benzyl | H | n-C₃H₇ | H |
| phenylbutyl | CH₃ | CH₃ | H |
| phenylpropyl | C₂H₅ | 4-CH₃C₆H₄CH₂ | H |
| methyl | H | 4-IC₆H₄CH₂ | H |
| butyl | H | 2,4-Br₂C₆H₃ | H |
| benzyl | H | 2-(C₄H₃S)(CH₂)₃ | H |
| Do | H | 2-(C₄H₃S)CH₂ | H |
| Do | H | 4-C₅H₄N | H |
| Do | H | 3-C₅H₄N | H |
| methyl | H | 6-CH₃-2-C₅H₄N | H |
| phenyl | H | (C₄H₃O)(CH₂)₃ | H |
| benzyl | H | 4-CH₃COC₆H₄CH₂ | H |
| Do | CH₃ | 4-BrC₆H₄ | H |
| Do | H | 4-FC₆H₄CH₂ | CH₃ |
| Do | H | 6-C₂H₅-2-(C₅H₃N) | C₃H₇ |
| Do | H | 4-C₂H₃C₆H₄CH₂ | H |
| Do | H | CH₃ | H |
| Do | H | C₆H₅(CH₂)₄ | H |
| Do | H | cyclopropyl-CH₂ | H |
| methyl | H | 4-CF₃-C₆H₄ | H |
| Do | H | 4-CF₃-C₆H₄CH₂ | H |
| Do | H | 4-CN-C₆H₄ | H |
| Do | H | 2-CH₃-5-(C₄H₃O)CH₂ | H |
| benzyl | H | pyrryl | H |
| Do | H | pyrryl-CH₂ | H |
| Do | H | pyrazyl | H |
| Do | H | pyrazolyl-CH₂ | H |
| methyl | H | HOCH₂CH₂ | H |
| butyl | H | CH₃OCH₂CH₂ | H |
| benzyl | H | allyl | CH₃ |

In the above table C₅H₂N stands for pyridyl; C₄H₃O and C₄H₃S for furyl and thienyl respectively.

EXAMPLE VII

The hydrochloride salt of N-picolyl-β-(carbobenzoxyhydrazino)propionamide is prepared by dissolving the compound in an aqueous solution containing an equivalent amount of hydrochloric acid and evaporating the resulting solution.

Other acid addition salts of the new pyridine compounds of the present invention described in the above examples are prepared by this same procedure employing sulfuric, phosphoric, hydrobromic, benzenesulfonic and toluenesulfonic acids.

EXAMPLE VIII

A tablet base is prepared by blending the following ingredients in the proportion by weight indicated:

Sucrose, U.S.P. _____ 80.3
Tapioca starch _____ 13.2
Magnesium stearate _____ 6.5

Into this tablet base is blended sufficient N-benzyl-β-(carbobenzoxyhydrazino)propionamide to provide tablets each containing 10, 25, 50 and 100 mg. of active ingredient.

EXAMPLE IX

Aqueous suspensions are prepared each containing 25 mg. per teaspoonful (25 ml.) of each of the above described therapeutic agents in a vehicle composed of U.S.P. simple syrup containing the following materials per 100 ml. of vehicle:

F.D. & C. Yellow No. 5 _____ mg__ 5
Carbomethoxy cellulose low-viscosity type ___mg__ 1
Synthetic lemon flavor (Freitsche) _____ml__ 0.5

The suspensions are well adapted for oral administration of the active agent.

In addition to their use in the treatment of mental disease, the compounds of the present invention are effective monamine oxidase inhibitors especially in the central nervous system and are also useful for the relief of anginal pain. Many of these compounds possess anticonvulsant properties. These compounds are additionally useful for the amelioration of mood in rheumatoid arthritis, etc.

In Example I, reference is made to N-carbobenzoxy-N'-bis[β-(benzylcarboxamido)ethyl]hydrazine, the bis-alkylation product which is coproduced with the product of this example. Of course, bis-alkylation is known to occur in the condensation of α,β-unsaturated acid derivatives with hydrazines. It may be minimized appreciably by the use of high dilution of the reactants and/or the use of excess hydrazide.

The mono-alkylation products, viz. the compounds of the present invention, are separated from the bis-alkylation products by standard procedures of fractional crystallization. Routine laboratory experimentation will indicate suitable solvents for this purpose. For example, such solvents will include mixtures such as methanol-ethyl acetate, ethyl acetate-hexane, methanol-ether and the like.

The bis-alkylation products produced along with the present compounds also possess psychic energizer activity and are effective in the treatment of mental depression.

What is claimed is:

1. A compound selected from the group consisting of compounds of the formula:

ROCONHNHCH(R₃)CH₂CONR₁R₂ wherein:

R is selected from the group consisting of lower alkyl, phenyl and phenylalkyl in which the alkyl group contains up to 4 carbon atoms;

R₁ is selected from the group consisting of hydrogen and lower alkyl;

R₂ is selected from the group consisting of alkyl and alkenyl containing up to 5 carbon atoms; cycloalkyl containing 3 to 6 carbon atoms, pyridyl, pyridylalkyl, furylalkyl and thienylalkyl in which the alkyl group is lower alkyl, and ring-substituted derivatives thereof in which each ring-substituent is lower alkyl; aryl and aralkyl of the formula:

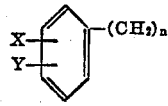

wherein X is selected from the group consisting of hydrogen, lower alkyl and halogen; Y is selected from the group consisting of hydrogen, lower alkyl, lower alkoxy, halogen, trifluoromethyl, cyano and alkanoyl containing 2 to 4 carbon atoms; and n is an integer from 0 to 4; and R₃ is selected from the group consisting of hydrogen and alkyl containing up to 3 carbon atoms; and the acid addition salts thereof.

2. The compound of the formula:

ROCONHNHCH₂CH₂CONHR₂ in which R and R₂ are each phenylalkyl in which the alkyl group contains up to 4 carbon atoms.

3. The compound of the formula:

ROCONHNHCH₂CH₂CONHR₂ in which R is lower alkyl and R₂ is phenylalkyl in which the alkyl group contains up to 4 carbon atoms.

4. The compound of the formula:

ROCONHNHCH$_2$CH$_2$CONHR$_2$ in which R and R$_2$ are each lower alkyl.

5. The compound of the formula:

ROCONHNHCH$_2$CH$_2$CONHR$_2$ in which R is phenylalkyl in which the alkyl group contains up to 4 carbon atoms and R$_2$ is lower alkyl.

6. N-benzyl-β-(carbobenzoxyhydrazino)propionamide.
7. N-benzyl-β-(carbomethoxyhydrazino)propionamide.

References Cited in the file of this patent
UNITED STATES PATENTS 2,894,972   Bloom et al. _____ July 14, 1959